(12) United States Patent
Gerlach

(10) Patent No.: US 11,135,916 B2
(45) Date of Patent: Oct. 5, 2021

(54) METHOD AND APPARATUS FOR INTEGRATION OF VEHICLE APPLICATIONS

(71) Applicant: VOLKSWAGEN AG, Wolfsburg (DE)

(72) Inventor: Simon Gerlach, Meine (DE)

(73) Assignee: VOLKSWAGEN AG

( * ) Notice: Subject to any disclaimer, the term of this patent is extended or adjusted under 35 U.S.C. 154(b) by 82 days.

(21) Appl. No.: 14/972,147

(22) Filed: Dec. 17, 2015

(65) Prior Publication Data
US 2016/0263996 A1 Sep. 15, 2016

(30) Foreign Application Priority Data
Mar. 11, 2015 (DE) .................... 10 2015 204 336.3

(51) Int. Cl.
| | | |
|---|---|---|
| B60K 35/00 | (2006.01) | |
| H04W 4/50 | (2018.01) | |
| H04W 4/60 | (2018.01) | |
| G06F 3/14 | (2006.01) | |
| H04L 29/08 | (2006.01) | |
| B60K 37/06 | (2006.01) | |

(52) U.S. Cl.
CPC .............. *B60K 35/00* (2013.01); *B60K 37/06* (2013.01); *G06F 3/1454* (2013.01); *G06F 3/1462* (2013.01); *H04L 67/125* (2013.01); *H04W 4/50* (2018.02); *H04W 4/60* (2018.02); *B60K 2370/55* (2019.05); *B60K 2370/563* (2019.05); *B60K 2370/566* (2019.05); *B60K 2370/569* (2019.05); *B60K 2370/573* (2019.05); *G09G 2370/16* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 8,621,483 B2 | 12/2013 | Park | |
| 2014/0095000 A1 | 4/2014 | Wäller et al. | |
| 2014/0277937 A1 | 9/2014 | Scholz et al. | |
| 2014/0280580 A1 | 9/2014 | Langlois et al. | |
| 2015/0127215 A1* | 5/2015 | Chatterjee | ............. H04W 4/046 701/36 |
| 2016/0034238 A1* | 2/2016 | Gerlach | ............. G06F 3/04817 345/1.1 |

(Continued)

FOREIGN PATENT DOCUMENTS

| | | |
|---|---|---|
| DE | 102012216919 A1 | 5/2014 |
| JP | 2012149923 A | 8/2012 |

(Continued)

*Primary Examiner* — Navid Ziaeianmehdizadeh
(74) *Attorney, Agent, or Firm* — Barnes & Thornburg, LLP

(57) ABSTRACT

Integration of at least one vehicle application for a vehicle, wherein each vehicle application is designed to control a function of the vehicle. This may be achieved by establishing a communications link between a mobile device and the vehicle, and transmitting data from the at least one vehicle application from the vehicle to the mobile device via the communications link or by launching an application on the mobile device, wherein a message is sent from the mobile device to the vehicle when the application has been launched and execution of a vehicle application is launched in the vehicle on the basis of the message.

5 Claims, 2 Drawing Sheets

(56) References Cited

U.S. PATENT DOCUMENTS

2016/0150020 A1\* 5/2016 Farmer .................. H04L 67/12
  455/420
2016/0212254 A1\* 7/2016 Akama ............... H04M 1/6083

FOREIGN PATENT DOCUMENTS

| JP | 2012214155 A | 11/2012 |
|----|--------------|---------|
| KR | 20150009815 A | 1/2015 |
| WO | 2012174524 A2 | 12/2012 |
| WO | 2013111952 A1 | 8/2013 |

\* cited by examiner

METHOD AND APPARATUS FOR INTEGRATION OF VEHICLE APPLICATIONS

PRIORITY CLAIM

This patent application claims priority to German Patent Application No. 10 2015 204 336.3, filed 11 Mar. 2015, the disclosure of which is incorporated herein by reference in its entirety.

SUMMARY

Illustrative embodiments relate to integrating vehicle applications, i.e., applications that control a function of a vehicle, in particular on a mobile device, e.g., a smartphone.

Illustrative embodiments improve the integration of vehicle applications into the application environment of a mobile device so that operating the different applications presents as few differences as possible between the vehicle applications and the other applications.

Illustrative embodiments provide a method for controlling at least one vehicle application for a vehicle, by a device for controlling at least one vehicle application for a vehicle, or by a computer program product.

BRIEF DESCRIPTION OF THE DRAWINGS

Disclosed embodiments are described in detail below with reference to the figures.

DETAILED DESCRIPTION OF THE DISCLOSED EMBODIMENTS

Figure 1:
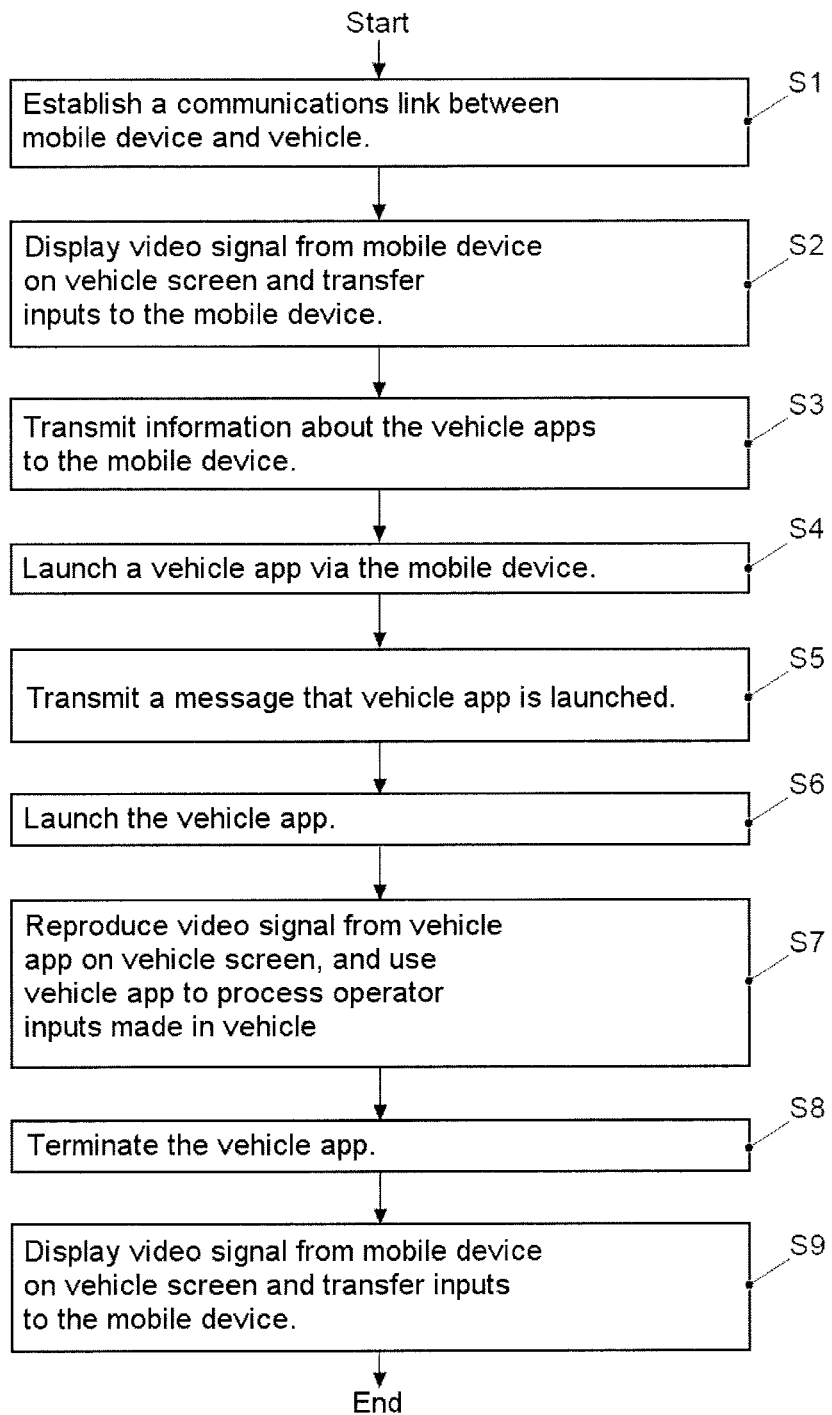
FIG. 1 shows a flow diagram of a disclosed method.

Disclosed embodiments provide a method for controlling one or more vehicle applications for a vehicle. In this method, the vehicle application or each of the vehicle applications is designed to control a specific function of the vehicle, wherein controlling the function includes configuring (the function). These vehicle applications in particular comprise applications of an infotainment system of the vehicle. The disclosed method comprises the following steps:

Establishing a cable-based or wireless communications link between a mobile device and the vehicle.
Transmitting data from the vehicle application(s) from the vehicle to the mobile device by means of the communications link. The data comprises information for the vehicle application or for each of the vehicle applications, to launch the vehicle application concerned via the mobile device using this information. In particular as part of the handshake process of the relevant mirroring technology, a list of vehicle application(s) is transmitted from the vehicle to the mobile device.

On the basis of the data transmitted from the vehicle, the smartphone (mobile device) can integrate the vehicle application(s) into the set of applications that already exist on the mobile device, and, for instance, display the application(s) on the start screen. Examples of vehicle applications include configuring a driver assistance system in the vehicle, reading out data (relating to the vehicle status) or setting certain parameters of a sound system in the vehicle.

The information that is transmitted for the vehicle application concerned from the vehicle to the mobile device comprises an individual icon of the vehicle application concerned and/or an identification of the vehicle application concerned and/or a name of the vehicle application concerned.

This information can be used to display the vehicle application concerned on the mobile device and to address (launch) this application via the mobile device.

When the vehicle application concerned is launched via the mobile device, a message is sent from the mobile device to the vehicle (in particular to the infotainment system), which message is used to request the vehicle to launch the vehicle application concerned in the vehicle.

By using the message to notify the vehicle or the vehicle infotainment system which vehicle application to launch, the vehicle can respond accordingly (i.e. launch the vehicle application concerned) without needing to ask for further information.

Launching the vehicle application concerned via the mobile device in particular causes the vehicle application concerned to be executed in the vehicle (e.g. in the infotainment system). Using the vehicle application, relevant functions of the vehicle can then be configured or controlled by the vehicle application.

For instance, execution of the vehicle application in the vehicle can output on a screen of the vehicle a video signal generated by the vehicle application, and/or can process operator inputs captured by controls in the vehicle. In other words, by executing the vehicle application, the process known as mirroring, which is used to reproduce the video signal from the mobile device on the screen of the vehicle, is suspended, and instead the video signal from the vehicle application running in the vehicle is reproduced on the screen. Similarly, the transfer of the operator inputs from controls in the vehicle to the mobile device is also suspended, and the operator inputs are processed by the vehicle application itself.

Terminating execution of the vehicle application concerned in the vehicle results in the video signal sent by the mobile device being displayed on the vehicle screen, and/or the operator inputs from the controls in the vehicle being transferred to the mobile device.

In other words, terminating the vehicle application concerned returns to the situation in which the mobile device has control over the screen, and operator inputs captured by controls in the vehicle are processed by the mobile device not by the vehicle.

Disclosed embodiments also provide a further method for controlling one or more vehicle applications. This further disclosed method comprises the following steps:

Launching an application on the mobile device. This application is a special application which must be developed for the mobile device platform concerned of the mobile device concerned and for the relevant mirroring technology. In particular, this application is downloaded and installed in the mobile device before execution of the further method.
Sending a special message, in particular via proprietary data channels, from the mobile device to the vehicle when this application is launched on the mobile device. The main or single task of this application is to notify the vehicle (e.g. the vehicle infotainment system) of the launch of the corresponding special application.
Launching the vehicle application (if there is only one vehicle application) or one of the vehicle applications (if there is a plurality of vehicle applications) in the vehicle on the basis of the special message that was received by the vehicle. In other words, the message notifies the vehicle which vehicle application to launch in the vehicle.

By use of one or more applications (shell applications) on the mobile device, the further disclosed method provides a simple way of integrating vehicle applications into the application environment on the mobile device without having to adapt the mirroring protocols. For this purpose, one shell application exists on the mobile device for every vehicle application to be launched by the mobile device. By launching one of these shell applications in the mobile device, it is then possible to launch in the vehicle the vehicle application associated with this shell application.

As soon as the shell application concerned is launched on the mobile device, thereby initiating execution of the relevant vehicle application in the vehicle, a video signal is output in particular on a screen of the vehicle, which signal is not received from the mobile device but is generated by the vehicle (e.g. by the vehicle application concerned). Moreover in particular, operator inputs from controls in the vehicle are processed by the vehicle itself (namely by the relevant vehicle application) and no longer need to be transferred to the mobile device.

In other words, the output of the video signal or video stream of the mirroring technology is suspended, and operator inputs are no longer transferred to the mobile device. Instead, for example, icons of the launched or executed vehicle application can be displayed on the vehicle screen to allow the vehicle application to be operated using the controls in the vehicle.

Terminating execution of the vehicle application results in the video signal sent by the mobile device being displayed on the vehicle screen, and/or the operator inputs from the controls in the vehicle being transferred to the mobile device.

By terminating the vehicle application, the mobile device resumes control over the screen, and operator inputs captured by controls in the vehicle are processed by the mobile device rather than by the vehicle.

Disclosed embodiments also provide a device for controlling one or more vehicle applications for a vehicle. The device comprises a controller (a processor), a communications device for communicating with a mobile device, a screen and controls. The disclosed device is designed to establish a communications link with the mobile device by means of the communications device, and to send data from the vehicle application(s) to the mobile device via the communications link. The data comprises information for each of the vehicle applications to be able to launch the vehicle application concerned via the mobile device using this information.

In addition, the disclosed embodiments also provide a further device for controlling one or more vehicle applications for a vehicle. The further disclosed device again comprises a controller (a processor), a communications device for communicating with a mobile device, a screen and controls. The further disclosed device is designed to receive a message from the mobile device by means of the communications device, and to use the controller to launch one of the vehicle applications on the basis of the message.

In addition, the disclosed embodiments provide a vehicle which comprises a disclosed device or a further disclosed device.

Finally, the disclosed embodiments provide a computer program product, in particular a computer program (an application) or a piece of software which can be loaded into a programmable controller memory or into a processor of a mobile device. This computer program product can be used to implement all or various embodiments described above of the further disclosed method when the computer program product is running in the processor of the mobile device. The computer program product comprises program means for sending a message from the mobile device to a vehicle when the computer program or application is launched. A vehicle application can then be launched in the vehicle on the basis of this message.

Disclosed embodiments can be used to integrate vehicle applications (e.g. native functions of an infotainment system) with other applications on a mobile device, whereby there is no awareness of two different worlds (the world of the vehicle applications and the world of the other applications on the mobile device). To this end, the vehicle applications may be integrated into an existing menu of the mobile device to make the vehicle applications available by means of mirroring technology. The vehicle applications can thereby be integrated in the familiar look and feel of the mobile device platform concerned and displayed like all the other applications in the menu (home screen, start screen or desktop) of the mobile device, wherein the menu can be displayed on a screen of the vehicle.

In other words, the applications of the mobile device are not integrated into a menu of the vehicle (e.g. of the vehicle infotainment system) but rather the vehicle applications are integrated into the existing menu of the mobile device. This menu of the mobile device can be displayed either on the screen of the mobile device or on the screen of the vehicle. Similarly, the vehicle applications can be operated via the mobile device or via controls in the vehicle.

Disclosed embodiments provide a deeper integration of native functions in the vehicle or in the infotainment system and of other applications on mobile devices, as a result of which the difference (e.g. in the operation and in the display) between the vehicle applications and the other applications is practically eliminated.

Since implementing the shell application, as it is known, entails certain implementation problems (supporting different mobile device platforms) and maintenance costs (aligning with new versions of a mobile device platform), the disclosed embodiments that work without the shell application are favored.

Disclosed embodiments may be used in motor vehicles. Obviously the disclosed embodiments are not restricted to this area of use, because the disclosed embodiments can also be used with ships, aircraft and with railway or tramway vehicles. Furthermore, the disclosed embodiments can also be used in principle with stationary objects, for example, to integrate applications that control functions in a home with other applications on a mobile device.

FIG. 1 shows a flow diagram of a disclosed method.

In the step S1, a communications link is established between a mobile device and a vehicle. Then the step S2 displays video signals from the mobile device on a screen of the vehicle (a process also known as mirroring) and transfers inputs captured via controls in the vehicle to the mobile device. In the step S3, as part of the standard mirroring-technology handshake, not only is the screen resolution agreed but also a list of vehicle applications that can be used to control or configure functions of the vehicle is transmitted to the mobile device. In this process, information comprising an icon, an identification and a name of the vehicle application concerned is transmitted for each vehicle application in the list. This information can be used to display on the mobile device every vehicle application as previously transmitted icons. This information can also be used to create a message to notify the vehicle, when the relevant icon is pressed, which icon was pressed, in other words which vehicle application to launch in the vehicle.

If, in the step S4, one of these vehicle applications is now launched via the mobile device, in the step S5 a message or notification is sent from the mobile device to the vehicle (the vehicle infotainment system) to notify the vehicle that a vehicle application is meant to be launched and which vehicle application to launch. After receiving this message, the vehicle launches the relevant vehicle application in the step S6. Thereupon, in the step S7, the vehicle terminates the mirroring-technology video streaming and essentially assumes control of the display by generating its own video signal and displaying same on a display of the vehicle. In addition, in accordance with the step S7, operator inputs at controls in the vehicle are no longer transferred to the mobile device but are processed by the vehicle itself (more precisely by the vehicle application running in the vehicle). An interface (HMI: Human Machine Interface) of the vehicle application can also be displayed on the touchscreen (the display of the vehicle).

If the vehicle application is closed or terminated (step S8), which is possible, for instance, by pressing a hard key (on the mobile device or in the vehicle) or actuating a close soft-key (on a control in the vehicle or on the mobile device), then in the step S9 the mirroring-technology video stream is re-enabled, and the operator inputs from the controls in the vehicle are again transferred to the mobile device.

Figure 2:
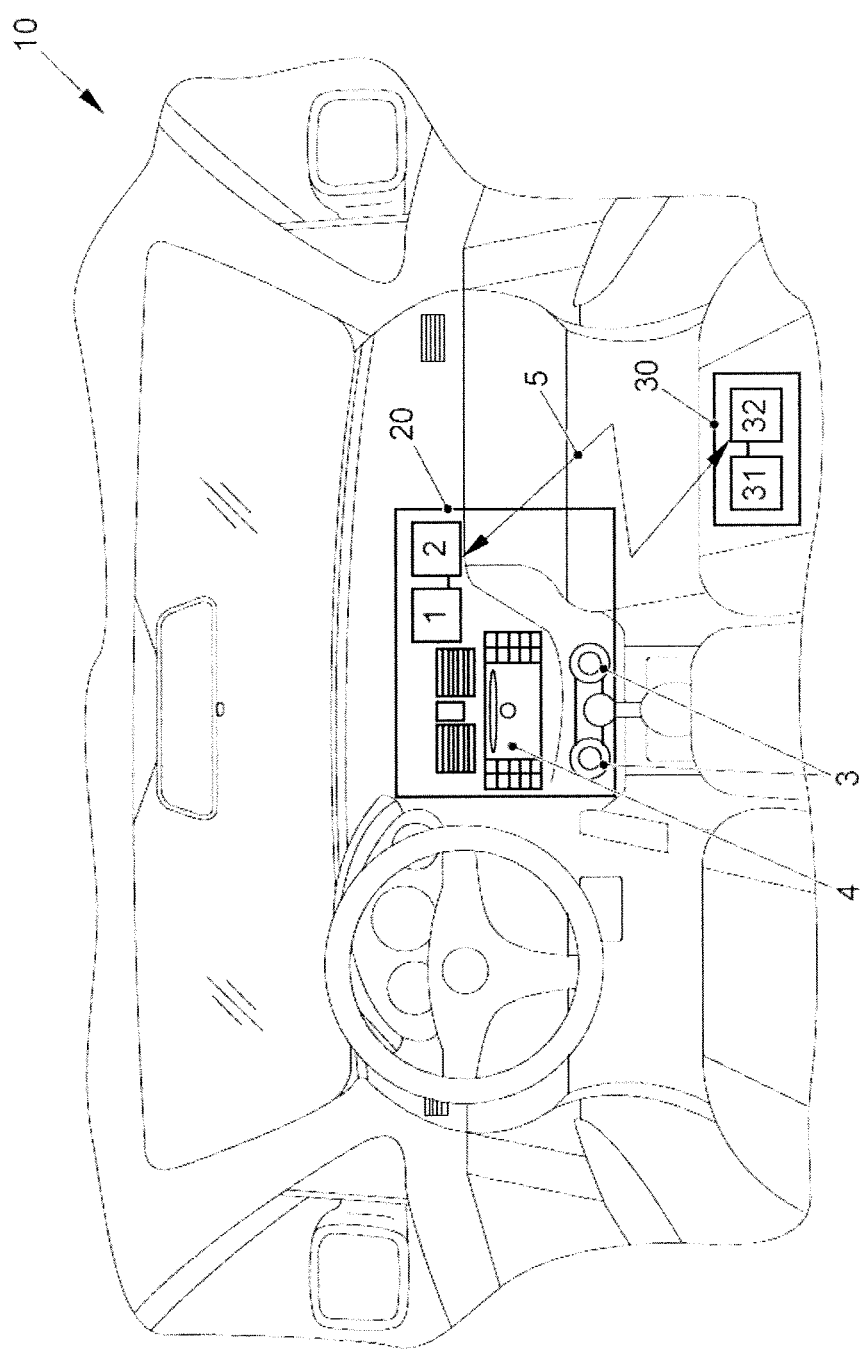
FIG. 2 shows a disclosed vehicle comprising a disclosed device.

FIG. 2 shows a disclosed vehicle 10, which comprises a disclosed device 20. The disclosed device 20 in turn comprises a controller or a processor 1, a communications device 2, controls 3 and a screen or touchscreen 4. A wireless communications link 5 to a mobile device 30, which comprises a processor 31 and a memory 32, can be established via the communications device 2.

Illustrative embodiments relate to integrating vehicle applications, i.e., applications that control a function of a vehicle, in particular on a mobile device, e.g., a smartphone.

US 2014/0277937 A1 discloses accessing functions of a mobile device from a vehicle.

U.S. Pat. No. 8,621,483 B2 similarly describes providing on a mobile device applications for a vehicle infotainment system.

WO 2012/174524 A2 describes a method for simplifying the integration of vehicle functions in a telematics system.

According to the prior art, the functions or applications provided by a smartphone can be made available under a particular main-menu item in the infotainment system of a vehicle. This is possible, for example, using what are known as mirroring technologies, for instance MirrorLink, Google Auto Link or Car Play, which allow applications of a smartphone to be operated via controls in a vehicle.

Thus, disclosed embodiment improve the integration of vehicle applications into the application environment of a mobile device, so that operating the different applications presents as few differences as possible between the vehicle applications and the other applications.

LIST OF REFERENCES 1 controller
2 communications device
3 control
4 screen
5 communications link
10 vehicle
20 device
30 smartphone
31 processor
32 memory

The invention claimed is:

1. A method for controlling at least one vehicle application for a vehicle, wherein each of the at least one vehicle applications controls a function of the vehicle, the method comprising:
   mirroring a mobile device video signal by reproducing the video signal in a screen of the vehicle;
   transmitting, as part of a mirroring handshake, a list of vehicle applications from the vehicle to the mobile device, launching an application on the mobile device corresponding to one of the list of vehicle applications received from the vehicle;
   sending a message from the mobile device to the vehicle that the application has been launched, the message requesting the vehicle to launch a vehicle application, wherein an only task of the launched application on the mobile device is to request the vehicle launch the vehicle application;
   controlling the launching of the at least one vehicle application in the vehicle and suspending the mirroring of the mobile device video signal on the basis of the message, wherein the launching the vehicle application includes generating the video signal by the vehicle being output on the screen of the vehicle, and the vehicle processing operator inputs from controls in the vehicle;
   and controlling a function of the vehicle displayed on the screen via vehicle controls, by processing the inputs from controls in the vehicle without transfer of signals back to the mobile device,
   wherein termination of the vehicle application includes resumption of the mirroring of the mobile device video signal by sending the video signal from the mobile device, the vehicle receiving the video signal from the mobile device, and the video signal from the mobile device being output on the screen of the vehicle.

2. A device for controlling at least one vehicle application for a vehicle, wherein each of the at least one vehicle applications controls a function of the vehicle, the device comprising:
   a controller;
   a communications device for communicating with a mobile device and receiving a mirroring of a mobile device video signal and reproducing the mobile device video signal in a vehicle screen;
   vehicle controls, wherein the device transmits, as part of a mirroring handshake, a list of vehicle applications from the vehicle to the mobile device,
   receives a message from the mobile device by the communications device to use the controller and launches one of the list of at least one vehicle applications in the vehicle and suspends mirroring of the mobile device video signal being received from the mobile device on the basis of the message, and controls a function of the vehicle displayed on the screen via the vehicle controls by processing the inputs from controls in the vehicle without transfer of signals back to the mobile device, wherein the termination of the vehicle application includes resumption of the mirroring of the mobile device video signal by sending the video signal from the mobile device, the vehicle receiving the video signal from the mobile device, and the video signal from the mobile device being output on the screen of the vehicle.

3. The device of claim 2, wherein the device implements a method for controlling at least one vehicle application for the vehicle, wherein each of the at least one vehicle applications controls a function of the vehicle, the method comprising:

launching an application on the mobile device;

sending a message from the mobile device to the vehicle that the application has been launched; and launching one of the at least one vehicle applications in the vehicle based on the message.

4. The device of claim 2, wherein the launching of the vehicle application includes generating the video signal by the vehicle being output on the screen of the vehicle, or the vehicle processing operator inputs from controls in the vehicle.

5. A computer program product which comprises a non-transitory program in a mobile device, which comprises program instructions for:

mirroring a mobile device video signal by reproducing the video signal in a screen of a vehicle, receiving a list of information regarding vehicle applications from the vehicle as part of a mirroring handshake, sending a message from the mobile device to the vehicle when the program is launched, the message comprising a request for the vehicle to launch a particular vehicle application of the list of vehicle applications information received from the vehicle, wherein one of at least one of the list of vehicle applications is launched in the vehicle and the mirroring of a mobile device video signal being sent from the mobile device is suspended on the basis of the message, and wherein each of the list of at least one vehicle applications is designed to control a function of the vehicle based on vehicle controller inputs, by processing the inputs in the vehicle without transfer of signals back to the mobile device, wherein the termination of the vehicle application includes resumption of the mirroring of the mobile device signal by sending the video signal from the mobile device, the vehicle receiving the video signal from the mobile device, and the video signal from the mobile device being output on the screen of the vehicle.

\* \* \* \* \*